United States Patent
Johnson et al.

(10) Patent No.: US 9,453,577 B2
(45) Date of Patent: Sep. 27, 2016

(54) VARIABLE TG ARTICLE, METHOD OF MAKING, AND USE OF SAME

(71) Applicants: Michael H. Johnson, Katy, TX (US); Nicholas Carrejo, Katy, TX (US)

(72) Inventors: Michael H. Johnson, Katy, TX (US); Nicholas Carrejo, Katy, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 0 days.

(21) Appl. No.: 14/490,089

(22) Filed: Sep. 18, 2014

(65) Prior Publication Data

US 2015/0069711 A1    Mar. 12, 2015

Related U.S. Application Data

(62) Division of application No. 13/478,387, filed on May 23, 2012, now Pat. No. 8,952,105.

(51) Int. Cl.
| | |
|---|---|
| *F16J 15/20* | (2006.01) |
| *C09K 3/10* | (2006.01) |
| *C08L 81/00* | (2006.01) |
| *F16J 15/02* | (2006.01) |
| *E21B 33/06* | (2006.01) |
| *E21B 33/12* | (2006.01) |

(52) U.S. Cl.
CPC ............ *F16J 15/20* (2013.01); *C08L 81/00* (2013.01); *C09K 3/10* (2013.01); *E21B 33/06* (2013.01); *E21B 33/1208* (2013.01); *F16J 15/022* (2013.01); *C09K 2003/1068* (2013.01)

(58) Field of Classification Search
CPC ............... C08L 65/02; C08L 2205/04; F16J 15/32–15/3236; F16J 15/022
USPC ........................................................ 525/416
See application file for complete search history.

(56) References Cited

U.S. PATENT DOCUMENTS

| | | | | |
|---|---|---|---|---|
| 4,423,099 A | * | 12/1983 | Mueller | ............... A01N 25/10 424/419 |
| 4,981,912 A | | 1/1991 | Kurihara | |
| 6,342,652 B1 | * | 1/2002 | Harada | .................... C08J 3/12 428/308.4 |
| 7,858,706 B2 | | 12/2010 | Arroila et al. | |

(Continued)

FOREIGN PATENT DOCUMENTS

| | | |
|---|---|---|
| JP | 2000226539 A  * | 8/2000 |
| WO | 2011119316 A1 | 9/2011 |

OTHER PUBLICATIONS

Christophe Rodriguez, "Oil and Gas Valve Sealing: Time for a rethink," [retrieved on Jun. 14, 2012]; retrieved rom the Internet http://www.kcicms.com/pdf/factfiles/emissioncontrol/vw1103_emissions_polymer.pdf?resourceId=180; 2p.

(Continued)

*Primary Examiner* — Mike M Dollinger
(74) *Attorney, Agent, or Firm* — Cantor Colburn LLP

(57) ABSTRACT

A seal comprises: a first portion including a crosslinked product of: a first crosslinked polymer; and a second crosslinked polymer; and a second portion including a polymer which is different than a constituent polymer in the first portion, wherein the seal has a gradient in glass transition temperature. A method for sealing comprises: disposing the seal of Claim 1 in an opening; heating the seal to a temperature greater than a minimum value of the glass transition temperature of the gradient; and applying pressure to an elastic portion of the seal for sealing the opening.

17 Claims, 7 Drawing Sheets

(56) References Cited

U.S. PATENT DOCUMENTS

| | | | |
|---|---|---|---|
| 8,365,833 B2 | 2/2013 | Carrejo et al. | |
| 8,604,157 B2 | 12/2013 | Gerrard et al. | |
| 2003/0032739 A1* | 2/2003 | Kerres | B01D 53/228 525/535 |
| 2004/0242802 A1* | 12/2004 | Voorheis | A63B 37/0003 525/386 |
| 2006/0226562 A1* | 10/2006 | Johnson | B29C 55/04 264/1.34 |
| 2007/0082755 A1* | 4/2007 | Sullivan | A63B 37/0003 473/371 |
| 2008/0171306 A1* | 7/2008 | Goldberg | C08G 61/10 433/220 |
| 2009/0011861 A1* | 1/2009 | Kuntimaddi | A63B 37/0003 473/374 |
| 2009/0163955 A1* | 6/2009 | Moumene | A61B 17/701 606/257 |
| 2009/0211770 A1 | 8/2009 | Nutley et al. | |
| 2010/0010114 A1* | 1/2010 | Myung | C08G 18/831 523/114 |
| 2010/0129676 A1* | 5/2010 | Fujimoto | B32B 15/14 428/462 |
| 2010/0210745 A1* | 8/2010 | McDaniel | C09D 5/008 521/55 |
| 2011/0120733 A1 | 5/2011 | Vaidya | |
| 2011/0139466 A1 | 6/2011 | Chen et al. | |
| 2011/0232901 A1* | 9/2011 | Carrejo | E21B 41/00 166/227 |
| 2012/0055667 A1 | 3/2012 | Ingram et al. | |
| 2012/0213969 A1* | 8/2012 | Mather | B29C 61/06 428/156 |
| 2013/0131210 A1* | 5/2013 | Gerrard | C08J 3/24 521/189 |
| 2013/0313780 A1* | 11/2013 | Johnson | C08L 81/00 277/300 |

OTHER PUBLICATIONS

International Search Report, Date of Mailing Sep. 24, 2013, International Application No. PCT/US2013/036367, Korean Intellecutual Property Office, 8 pages.

* cited by examiner

VARIABLE TG ARTICLE, METHOD OF MAKING, AND USE OF SAME

CROSS REFERENCE TO RELATED APPLICATIONS

This application is a divisional of U.S. application Ser. No. 13/478,387 filed May 23, 2012, now issued as U.S. Pat. No. 8,952,105, the disclosure of which is incorporated by reference herein in its entirety.

BACKGROUND

Elastomeric materials are used in various applications for sealing. Such a seal can be a dynamic or static seal. Depending on the environment, an elastomer seal can experience a range of temperatures, pressures, and chemicals. Elastomer seals can be used in high vacuum to multi-atmosphere pressures and from slightly below room temperature to elevated temperatures, e.g., 150° C. Both inert and reactive gases and liquids have been exposed to elastomers. While there exists no ideal elastomer seal, elastomers show a range resistance to chemical attack, thermal degradation, leak rate, and extrusion. In the oil and gas industry, an elastomer should maintain its mechanical properties under "wet" rather than under "dry" conditions at a given temperature, pressure, and service time while being exposed to corrosive chemicals.

Even with the most recent technologies, there nonetheless remains a need for elastomers, or any other polymeric materials, that function well and maintain their mechanical properties at high temperatures under wet conditions. High temperature polymers that are chemically resistant under dry conditions alone are readily available. Such polymers include certain thermoplastic polyimides (TPI) and polybenzimidazoles (PBI). Chemically resistant polymers useful under wet conditions at low temperature are also readily available. Examples of these polymers include certain polyethylenes and polypropylenes. Under conditions of high temperature and corrosive fluids, fluoropolymers are often used, as they are generally considered to have the best thermal stability and chemical resistance. Examples of fluoropolymers include polytetrafluoroethylene, and certain other fluoroelastomers and perfluoroelastomers. Certain grades of fluoropolymers are claimed to have a maximum continuous service temperature of 327° C. However, even the best perfluoroelastomers can become soft at high temperature over time, losing their capability to seal gaps under high pressure. Also, fluoroelastomers or perfluoroelastomers tend to develop cracks when contacted with various downhole fluids at high temperature.

Despite extensive research directed to replacing elastomers or increasing their resistance to degradation under high pressures, high temperatures and chemically and mechanically unforgiving environments such as in downhole conditions, there remains a need for elastomers having improved chemical resistance, particularly at such high temperatures. It would be a further advantage if the improved chemical resistance could be obtained without significantly adversely affecting other desirable properties of the elastomers, for example mechanical properties such as elasticity, extrusion resistance, and integrated structural strength. Materials and methods for elastomers useful in devices such as packers, blow out preventer elements, O-rings, gaskets, and the like that retain good mechanical properties at high temperature and high pressure when in contact with corrosive fluids over continuous service times would be well received in the art.

BRIEF DESCRIPTION

Disclosed in an embodiment is a seal includes a first portion including a crosslinked product of: a first crosslinked polymer; and a second crosslinked polymer; and a second portion including a polymer which is different than a constituent polymer in the first portion, wherein the seal has a gradient in glass transition temperature.

In a further embodiment, a method for sealing includes disposing the seal in an opening; heating the seal to a temperature greater than a minimum value of the glass transition temperature of the seal; and applying pressure to an elastic portion of the seal for sealing the opening.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
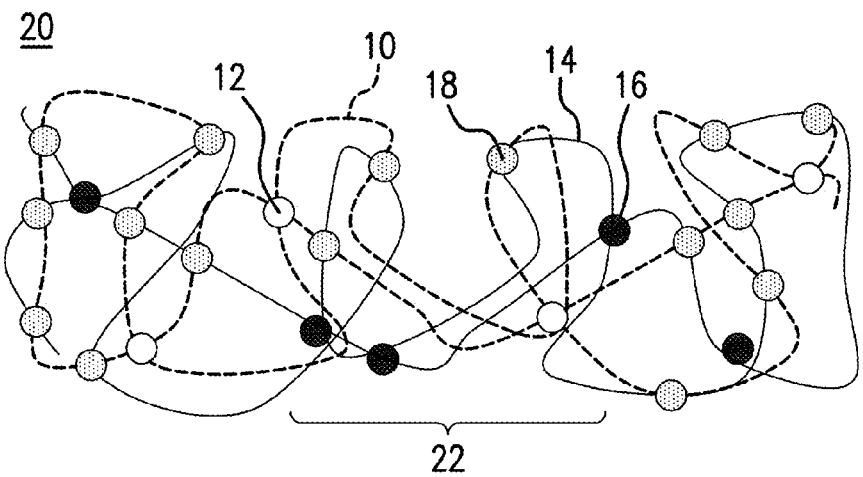
FIGS. 1A, 1B, and 1C show cross-sections of compositions having a crosslinked product of crosslinked polymers with a gradient in the glass transition temperature.

A detailed description of one or more embodiments of the disclosed material and method is presented herein by way of exemplification and not limitation with reference to the Figures.

It has been found that an elastomer composition containing a crosslinked product of crosslinked polymers provides a gradient in glass transition temperature to articles containing the elastomer composition. This elastomer composition beneficially can be used in an article such as a seal for a broad and tunable glass transition temperature (Tg). By virtue of this characteristic, a portion of an article including the elastomer composition can be in a glassy state while another portion is in an elastic state at a temperature greater than a minimum value of a glass transition temperature of the article. The article described herein exhibits elasticity at high temperatures or high pressure for an extended period of time.

The new high temperature, high pressure elastomer composition herein is rigid and tough at room temperature but behaves as a rubbery material at temperatures above room temperature. The elastomer composition has excellent elasticity, extrusion resistance, and integrated structural strength at high temperatures or high pressure. In a particularly advantageous feature, articles (e.g., seals) of the elastomer composition act as their own backup seal at certain temperatures and maintain their excellent properties even under continuous use. Due to this self backup property, the elastomer composition is advantageously useful as a high temperature, high pressure seal.

A polymer commonly classified as an elastomer (a rubbery material) typically has a single glass transition temperature (Tg) that has an onset temperature and has a transition from a glassy state to an elastic state over a narrow temperature range below room temperature. These elastomers become soft and thermally degrade over time when used at high temperature. Degradation is accelerated when these elastomers are exposed to corrosive fluids combined with high temperature or pressure such that the elastomers can be completely destroyed within a short period of time (e.g., days or even hours). One approach to improving high temperature chemical resistance has been to replace carbon in the elastomer backbone with a non-carbon element such as silicone, to provide a silicone rubber. Another approach has been to maintain the carbon backbone of the elastomer, but replace hydrogen with fluorine.

The materials and methods described herein represent a different approach, based on recognition that it is not necessary for the elastomer to have a Tg that is below room temperature and occur over a narrow temperature range nor does the Tg need to be single-valued. The new elastomer composition disclosed herein has instead been designed to provide an article with a gradient in its glass transition temperature (Tg) with a minimum value of the Tg above room temperature but lower than the minimal application temperature (MAT) of the elastomer composition. Furthermore, the Tg of the elastomer composition is tunable and broad, occurring over a wide temperature range. In addition, the article having the elastomer composition can have multiple, discreet glass transition temperatures. Thus, the elastomers herein are more similar to engineering plastics (rigid and strong) below the MAT, but elastomeric above the MAT. Candidates for the new high temperature, high pressure elastomer composition are therefore not limited to those polymers within the traditional classifications of elastomer materials. Rather, any polymer having good elasticity above the MAT, can be developed, evaluated, or used.

Potential materials for the manufacture of the high temperature elastomer composition include amorphous and semi-crystalline thermoplastic polymers that are capable of being molecularly crosslinked. Molecular chains of amorphous thermoplastic polymers behave like "random coils." After crosslinking, the coils tend to deform proportionally in response to an outside-applied force, and upon release of the outside-applied force, the coils tend to recover to their original configuration. In contrast, crystalline or semi-crystalline polymers have regions where molecular chains are regularly aligned with each other. Without being bound by theory, it is believed that crosslinking of a semi-crystalline polymer also can provide a restorative force that allows the semi-crystalline polymer to recover its original configuration or bulk geometry upon release of an outside-applied force that deformed the semi-crystalline polymer. The degree of molecular crosslinking of the thermoplastic polymers can be adjusted based on the material selected and the intended use of the high temperature, high pressure elastomer composition. In an embodiment, the degree of crosslinking varies in the elastomer composition to establish a gradient in glass transition temperature and to provide optimal elasticity. If the degree of crosslinking reaches a high density, rigidity and/or brittleness of the elastomer composition can increase.

Accordingly, there is provided, in an embodiment, a composition that includes a crosslinked product of a combination of crosslinked polymers such that an article comprising the composition has a gradient in glass transition temperature. In a non-limiting embodiment, the combination of crosslinked polymers includes a plurality of crosslinked polymers such as a first crosslinked polymer and a second crosslinked polymer. Exemplary crosslinked polymers include crosslinked polyarylenes, crosslinked polyaryl sulfides, crosslinked polyaryl sulfones, and crosslinked polysulfones. In a particular embodiment, the crosslinked polymer is crosslinked polyphenylene sulfide (x-PPS), crosslinked polyphenylsulfone (x-PPSU), crosslinked self-reinforced polyphenylene (x-SRP), crosslinked polyethersulfone (x-PESU), or a combination comprising at least one of the foregoing. Consequently, in one embodiment, the crosslinked product includes a crosslink between, for example, x-PPS, x-PPSU, x-SRP, x-PESU, or a combination comprising at least one of the foregoing. Descriptions of x-PPS, x-PPSU, and x-SRP and processes for making each are described in U.S. patent application Ser. Nos. 13/179,230, 13/229,923, 13/246,250, 13/303,688, and 13/343,264, the disclosure of each of which application is incorporated herein in its entirety.

A combination of crosslinked polymers that have different chemical or physical attributes can be used for making the crosslinked product, for example crosslinked polymers of different molecular weights, different substitution patterns, different viscosities, or different degrees of branching. In one embodiment, the first crosslinked polymer is different than the second crosslinked polymer. Alternatively, the first and second crosslinked polymers have the same molecular backbone (i.e., the basic polyphenylsulfone (PPSU), polyphenylene sulfide (PPS), self-reinforced polyphenylene (SRP), or polyethersulfones (PESU) backbone) with different chemical or physical attributes. In a particular embodiment, the first and second polymers are the same and have a different molecular weight, different substitution pattern, different viscosity, or different degree of branching. In a specific embodiment, the composition comprises the crosslinked product of crosslinked polyphenylene sulfide, crosslinked polyphenylene sulfone, and crosslinked self-reinforced polyphenylene.

The crosslinked polymer can be obtained by thermally crosslinking a base polymer in the presence of oxygen, sulfur, or a combination thereof. The base polymer can be polyphenylene sulfide, polyphenylsulfone, self-reinforced polyphenylene, polyethersulfone, and the like. Exemplary polyarylsulfones that can be used include polyphenylsulfone that are available from sources such as Solvay Specialty Polymers, Quadrant EPP, Centroplast Centro, Duneon, GEHR Plastics, Westlake Plastics, and Gharda Chemicals. Commercial grades of polyphenylsulfones include those with the trade names Radel®, Udel®, Ultrason®, and Gafone®. An example of a polyarylsulfone includes those that are commercially available under the trade name Astrel® from 3M. Exemplary polyphenylene sulfides include those with either a branched structure, such as those marketed under the trade name Ryton® by Chevron-Phillips, a linear structure, such as those marketed under the trade name Fortron® by Ticona, or a combination thereof. Exemplary self-reinforced polyphenylenes that can be used include those that are commercially available under the trade name PrimoSpire® PR-250 from Solvay Advanced Polymers. Exemplary polyethersulfones include those that are commercially available under the trade name Victrex PES® from ICI.

The crosslinked polymer can be prepared in a manner similar to producing the crosslinked product of the crosslinked polymers described below. In an embodiment, the crosslinked polymer is prepared by oxidative crosslinking a base polymer in the presence of a molecular crosslinking agent. In an embodiment, the molecular crosslinking agent can be oxygen (pure or from a mixture of gases including oxygen, e.g., air with or without an inert gas such as nitrogen, helium, argon, carbon dioxide), an inorganic oxidant (e.g., magnesium oxide), organic oxidant (e.g., dicumyl peroxide), or the like. In an embodiment, crosslinking is carried out in air. Ambient pressure or elevated pressure (>1 atmosphere) can be used, or a partial pressure lower than ambient can be used. Crosslinking of the base polymer can be carried out at a temperature of about 200° C. to about 400° C., in another embodiment about 250° C. to about 390° C., and in another embodiment about 300° C. to about 380° C. The curing time is for a total time of less than or equal to 200 hours, specifically less than 75 hours. In contrast to the base polymer, the crosslinked polymer is not soluble in solvents such as N-methyl-2-pyrrolidone (NMP) or N,N-dimethylformamide (DMF), which can be used to confirm that molecular crosslinking occurred. The crosslinked polymer also shows a rubber-like plateau having relatively high modulus at a temperature above its Tg. In an embodiment, the Tg of crosslinked polyphenylene increases from 120° C. for the base polymer (polyphenylene) to 180° C. for the crosslinked polyphenylene, as determined using dynamic mechanical analysis (DMA), which can be used to determine the elastic and storage moduli of the crosslinked polymer.

The crosslinked polymer has a Tg higher than ambient temperature. In an embodiment, the crosslinked polymer has a Tg of greater than or equal to about 50° C., specifically greater than or equal to about 100° C., and more specifically greater than or equal to about 150° C., and even more specifically greater than or equal to about 200° C. In an additional embodiment, the crosslinked polymer has a storage modulus of greater than or equal to about 1 megapascal (MPa), specifically about 1.2 MPa, and more specifically about 1.5 MPa, determined at a temperature of greater than or equal to about 250° C., in another embodiment greater than or equal to about 275° C., and in another embodiment greater than or equal to about 300° C.

The relative amount of the crosslinked polymers that are combined can vary. In an embodiment, the combination of crosslinked polymers includes a first crosslinked polymer and a second crosslinked polymer, where the amount of the first crosslinked polymer can be from about 5 weight percent (wt %) to about 95 wt %, and the amount of the second crosslinked polymer can be from about 5 weight percent (wt %) to about 95 wt %, based on the weight of the combination of crosslinked polymers. In another embodiment, the combination of crosslinked polymers includes a first, second, and third crosslinked polymer, wherein the amount of the first, second, and third crosslinked polymer can each be from about 0.01 (wt %) to about 95 wt %, based on the weight of the crosslinked polymers. In yet another embodiment, the combination of crosslinked polymers includes a plurality of crosslinked polymers in any relative weight percentage. In an embodiment, an article of the composition has a gradient in a concentration of any of the crosslinked polymers. In another embodiment, the article having the composition has a gradient in the concentration of the first crosslinked polymer. In an additional embodiment, the article having the composition has a gradient in the ratio of the amount of crosslinked polymers among the combination of crosslinked polymers. In a specific embodiment, an article having the composition has a gradient in the ratio of the amount of the first crosslinked polymer to the amount of the second crosslinked polymer. In one embodiment, the ratio of the amount of the first crosslinked polymer to the amount of the second crosslinked polymer is 1:1000 to 1000:1, specifically, 1:100 to 100:1, and more specifically, 1:50 to 50:1, based on the weight of the first and second crosslinked polymers.

According to an embodiment, the composition includes an additive. The additive can be combined with crosslinked polymers prior to crosslinking them together and formation of the crosslinked product thereof. Additive, as broadly used herein, includes any compound added to the crosslinked polymers or crosslinked product to adjust the properties of the elastic composition such as a filler, crosslinking agent, or processing aid.

Fillers, as used herein, include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethane (PTFE), $MoS_2$, or graphite can be added to the crosslinked polymers to increase the lubrication. Nanofillers are also useful, and can be reinforcing or non-reinforcing. Nanofillers, such as carbon nanotubes, nanographenes, nanoclays, polyhedral oligomeric silsesquioxane (POSS), or the like, can be incorporated with the crosslinked polymers to increase the strength and elongation of the composition. Nanofillers can further be functionalized to include grafts or functional groups to adjust properties such as solubility, surface charge, hydrophilicity, lipophilicity, and other properties. Combinations comprising at least one of the foregoing fillers can be used.

The crosslinked product of the elastomer composition is prepared by oxidative crosslinking a combination of crosslinked polymers in the presence of a molecular crosslinking agent. Crosslinking agents include oxygen and solid or liquid crosslinking agents such as peroxides, metal oxides, or sulfur.

When oxygen is used as a crosslinking agent, the oxygen can be provided in the form of a gas as either pure oxygen or in a mixture of gases. Where a mixture of gases is used, oxygen can be combined with inert gas such as nitrogen, helium, argon, or the like. Other gases can be present, for example carbon dioxide or the like. In an embodiment, air is used. The crosslinking can be carried out at ambient pressure, at a partial pressure lower than ambient, or at elevated pressures (greater than 1 atmosphere).

Peroxides can be used for crosslinking, for example organic peroxides such as ketone peroxides, diacyl peroxides, dialkyl peroxides, peroxyesters, peroxyketals, hydroperoxides, peroxydicarbonates, and peroxymonocarbonates. Examples of specific peroxides include 2,2-bis(t-butylperoxy)butane, 1,4-bis(tert-butylperoxyisopropyl)benzene, dicumyl peroxide, tert-butylcumylperoxide, 2,5-dimethyl-2,5-di-(tert-butylperoxy)hexane, n-butyl-4,4'-di(tert-butylperoxy)valerate, 1,1'-di(tert-butylperoxy)-3,3,5-trimethylcyclohexane, and the like; or inorganic peroxides such as calcium peroxide, zinc peroxide, hydrogen peroxide, peroxydisulfate salts, and the like. Commercially available peroxides include those marketed by Arkema, Inc. under the tradename DI-CUP® including, DI-CUP® dialkyl peroxide, DI-CUP®

40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Effective amounts of peroxides can be readily determined by one of skill in the art depending on factors such as the reactivity of the peroxide and the crosslinked polymer, the desired degree of cure, and like considerations, and can be determined without undue experimentation. For example, peroxides can be used in amounts of about 1 to about 10 parts per 100 parts by weight of the crosslinked polymers.

Metal oxides useful as a crosslinking agent include, for example, zinc oxide, magnesium oxide, titanium dioxide, or the like, or a combination thereof. According to an embodiment, magnesium oxide is combined with the crosslinked polymers prior to crosslinking them to form the crosslinked product. Sulfur can also be used for crosslinking, for example elemental sulfur. Combinations of the foregoing crosslinking agents can be used.

Other agents to initiate or accelerate cure as are known in the art can also be present, for example amine accelerators, sulfonamide accelerators, and the like. Effective amounts of crosslinking agent, activators, and the like are known in the art and can be determined without undue experimentation.

As with oxygen, crosslinking in the presence of a peroxide, sulfur, or other molecular crosslinking agent can be carried out at ambient pressure, at a partial pressure lower than ambient, or at elevated pressures (greater than 1 atmosphere). When peroxides, sulfur, or another solid or liquid crosslinking agent is used, the agent is generally compounded with the crosslinked polymers, which are then optionally shaped and crosslinked. The crosslinking agent can be pre-dispersed in a masterbatch and added to the crosslinked polymers to facilitate mixing.

A processing aid is a compound included to improve flow, moldability, and other properties of the elastomer composition containing the crosslinked product. Processing aids include, for example an oligomer, a wax, a resin, a fluorocarbon, or the like, or a combination comprising at least one of the foregoing. Exemplary processing aids include stearic acid and derivatives, low molecular weight polyethylene, and the like.

The crosslinked polymers can be crosslinked alone or in the presence of another polymer in order to obtain the desired properties of the crosslinked product of the elastomeric composition. However, the presence of other polymers may reduce chemical resistance. Thus, in an embodiment, no other polymer is present during crosslinking to form the crosslinked product. If used, in order to maintain the desired properties of the elastomer composition containing the crosslinked product, any amount of the additional polymers is limited, being present for example in amount of 0.01 to 20 wt %, 0.1 to 10 wt %, or 1 to 5 wt % of the total weight of the crosslinked polymers present. For example, if used, aromatic thermoplastic polymers can be present, such as aromatic polyamides, polyimides, polyetherimides, polyphenylene sulfides (PPS), polyaryletherketones (PAEK), polyetherether ketones (PEEK), polyether sulfones (PESU), polyphenylene sulfones (PPSU), polyphenylene sulfone ureas, or the like, or combinations comprising at least one of the foregoing. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly(ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, and the like. A reactive elastomer or fluoropolymer can be blended with the crosslinked polymer before crosslinking to form the crosslinked polymer, and graft to the crosslinked polymers during crosslinking to increase flexibility of the crosslinked product of the elastomer composition. Examples of reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

According to an embodiment, the elastomer composition comprising the crosslinked product of crosslinked polymers is prepared by oxidative crosslinking a base polymer as described above to make the crosslinked polymer. The crosslinked polymer is pulverized prior to compounding or molding. Pulverizing can be done by any suitable method including use of a mortar and pestle, ball mill, grinder, or the like, so long as the particle size of the resultant pulverized crosslinked polymer is suitable for adequate mixing. Any suitable particle size can be obtained by the pulverizing. In an embodiment, the crosslinked polymer is pulverized into a particle size of less than or equal to about 10 mesh, in another embodiment less than or equal to about 20 mesh, and in another embodiment less than or equal to about 40 mesh. It will be understood that "less than" a mesh size refers to particle size defined by mesh number, which is inversely correlated to particle size, i.e., the higher the mesh number, the smaller the particle size. According to an embodiment, the crosslinked polymer is pulverized to obtain a powder, pellets, or granules of the crosslinked polymer.

A combination of crosslinked polymers is produced by combining two or more crosslinked polymers by hand or in a device such as a mixer, blender, extruder, mold, and the like. In an embodiment, the crosslinked polymers are introduced in a device or container using variable feed rates. Thus, the feed rate of each crosslinked polymer can be the same as one another or different. Additionally, each feed rate can be independent of the any other feed rate. Since the feed rate of each crosslinked polymer can vary, the crosslinked polymers can be introduced into the device at the same time, different times, as well as being modulated at various rates and turned on and off at selected times.

In a particular embodiment, crosslinked polymers are introduced into an extruder. Optionally, an additive is also disposed with the crosslinked polymers in the extruder. A first crosslinked polymer is introduced into the extruder at first feed rate, and a second crosslinked polymer is introduced at a second feed rate. In an embodiment, the first and second crosslinked polymers are introduced simultaneously so that both crosslinked polymers are found at the same position in the barrel of extruder. According to an embodiment, the feed rate of a crosslinked polymer is varied to obtain a concentration gradient in the relative amounts of the crosslinked polymers. In one embodiment, a crosslinked polymer can be fed into the extruder, and then another crosslinked polymer can be fed into the extruder thereafter to obtain a gradient in the concentration of the crosslinked polymers in the extruder. The feed rate of the first crosslinked polymer can be decreased as the feed rate of the second crosslinked polymer is increased. As the crosslinked polymers propagate through the extruder, they are heated, compressed, and crosslinked to form the crosslinked product. The crosslinked product is passed through a die to make various forms of the elastomer composition such as sheet, tube, rings, pellets, pipe, and the like. The article prepared from elastomer composition thus produced has a gradient in glass transition temperature. Furthermore, the degree of crosslinking can vary in such an article containing the elastomer composition.

According to another embodiment, the crosslinked polymers are disposed in a mold, e.g., a compression mold. Similar to the extruder, crosslinked polymers can be introduced simultaneously, at different times, or at various time intervals. Additives can be optionally disposed along with the crosslinked polymers. Thus, different positions in the mold can have a different amount of one or more of crosslinked polymers such that a concentration gradient in the relative amount of the crosslinked polymers occurs. After loading the crosslinked polymers, the crosslinked polymers can be compressed and heated to form the crosslinked product of the crosslinked polymers. In this way, the degree of crosslinking can vary in an article having the elastic composition. The article having the elastic composition thus produced has a gradient in transition temperature. Forming the crosslinked product by crosslinking the crosslinked polymers can be achieved at a temperature from 150° C. to 350° C. for a time of 200 hours or less, specifically less 100 hours.

Figure 1B:
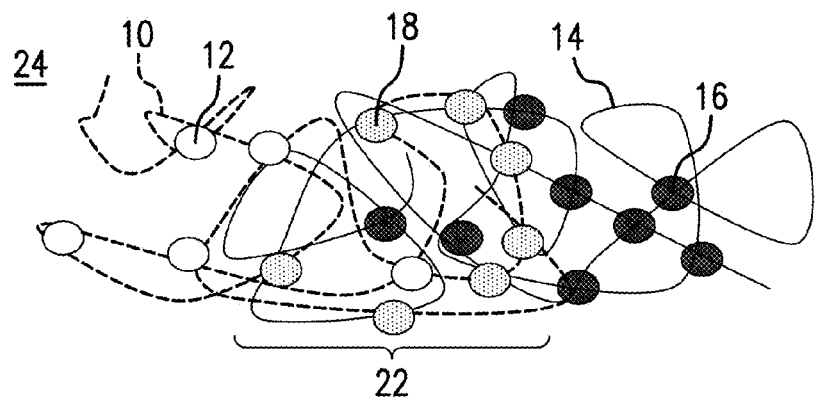
Figure 1C:
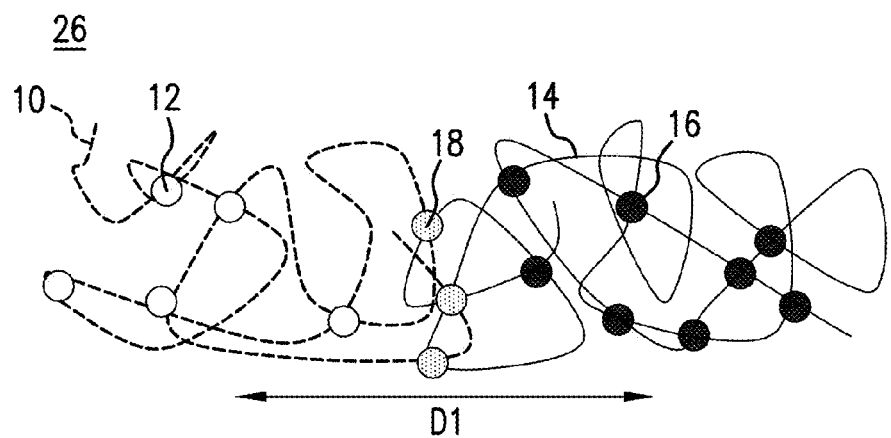

FIGS. 1A, 1B, and 1C show cross-sections of compositions having a crosslinked product of crosslinked polymers with a gradient in the glass transition temperature. In FIG. 1A, an elastomer composition 20 includes the crosslinked product of a first crosslinked polymer 10 (shown as a dotted curve) with first crosslinks 12 (white dots) and combined with a second crosslinked polymer 14 (solid curve) with second crosslinks 16 (black dots). The first crosslinked polymer 10 is crosslinked to the second crosslinked polymer 14 by product crosslinks 18 (grey dots). Here, the product crosslinks 18 are nonuniformly distributed within the elastomer composition 20 to establish the gradient in glass transition temperature of an article containing the elastomer composition. Accordingly, the article having the elastomer composition 20 has a central region 22 that has a minimum value of the onset of the transition between a glassy state and elastic state of the elastomer composition 20. Moreover, the gradient in glass transition temperature of the article having the elastomer composition 20 is uniform.

Referring to FIG. 1B, an article having an elastomer composition 24 includes a gradient in the concentration of the first crosslinked polymer and second crosslinked polymer with a greatest concentration of product crosslinks 18 in central region 22. Although, FIGS. 1A and 1B depict the highest density of product crosslinks 18 in the central region 22, the process to form the elastomer composition can be controlled to select a specific region of the elastomer composition having the greatest degree of crosslinking of the crosslinked product. In an embodiment, as shown in FIG. 1C, an article having an elastomer composition 26, has a discontinuous gradient in glass transition temperature. The first crosslinked polymer 10 shares relatively little overlap with the second crosslinked polymer 14 so that the article having the elastomer composition has a gradient in glass transition temperature characterized by more than one glass transition temperature along a length direction D1 of the elastomer composition 26. In an additional embodiment, the article having the elastomer composition can have both continuous and discontinuous gradients in glass transition temperature.

Due to the gradient in glass transition temperature, an article having the elastomer composition exhibits an onset in a transition between a glassy state and elastic state that varies according to particular portions of the elastomer composition in the article. In an embodiment, the article having the elastomer composition has a first portion that is in a glassy state and a second portion that is in an elastic state in response to exposure of the article having the elastomer composition to a temperature greater than a minimum value of the glass transition temperature of the elastomer composition. In a particular embodiment, an elastic state is present at a temperature greater than or equal to 200° F., specifically greater than or equal to 400° F., more specifically greater than or equal to 600° F., and even more specifically greater than or equal to 700° F. In another embodiment, an elastic state is present at a temperature from 200° F. to the thermal decomposition temperature of the elastomer composition. The thermal decomposition temperature of the elastomer composition is greater than or equal to 500° F., specifically greater than or equal to 600° F., more specifically greater than or equal to 700° F., and even more specifically greater than or equal to 800° F.

The article having the elastomer composition has a glass transition (i.e., a transition between an elastic state and glassy state) that occurs over a temperature domain of at least 50 degree on the Fahrenheit temperature scale, specifically 100 degrees, more specifically 150 degrees, even more specifically 200 degrees, yet more specifically 250 degrees, and yet even more specifically 375 degrees on the Fahrenheit temperature scale. Thus, in a non-limiting embodiment, the glass transition between the elastic state and the glassy state of the elastomer composition occurs over a temperature domain of 200 degrees (on the Fahrenheit temperature scale). Here, in response to heating the article having the elastomer composition from, for example, room temperature where the elastomer composition is in a glassy state, a portion of the article having the elastomer composition will transit from a glassy state to an elastic state at a minimum value of the glass transition temperature such that the portion becomes rubbery at, for example, 300° F. Since the glass transition occurs over a temperature domain of at 200 degrees in this embodiment, different portions of the article having the elastomer composition will transit from a glassy state to elastic state up to 500° F. It should be noted that the article having the elastomer composition herein can have a broad, diffuse glass transition temperature (occurring over a domain of temperatures) instead of a narrow temperature window for the Tg. Consequently, according to an embodiment, the article having the elastomer composition has a gradient in glass transition temperature at a temperature domain of 180° F. to 550° F., more specifically 200° F. to 500° F., even more specifically 200° F. to 400° F., and yet more specifically 300° F. to 500° F. Given that the gradient in glass transition covers these temperatures, the article having the elastomer composition can be said to have a glass transition temperature of, for example, 180° F. to 550° F., more specifically 200° F. to 500° F., even more specifically 200° F. to 400° F., and yet more specifically 300° F. to 500° F. Moreover, a minimum value of the glass transition temperature of an article having the elastomer composition corresponds to the lowest temperature at which the article develops a rubbery portion. For example, if the gradient in glass transition temperature is from 180° F. to 550° F., the minimum value of the glass transition temperature would be 180° F.

Related to the glass transition temperature is the storage modulus. The storage modulus of the elastomer composition is 4 MPa to 16 MPa, and specifically 8 MPa to 12 MPa as determined at 302° F. The elastomer composition also is resistant to corrosive liquids and gases and has a long shelf life as well as a long, continuous use lifetime, exceeding several years under high temperature and high pressure conditions.

Articles comprising the elastomer composition are prepared in numerous ways. In an embodiment, a process for making an article includes combining a first crosslinked polymer and a second crosslinked polymer to form a composition. The composition is compressed (e.g., in an extruder or mold) and heated to crosslink the first crosslinked polymer to the second crosslinked polymer in order to form the article. A crosslinking agent can be introduced with the first crosslinked polymer and the second crosslinked polymer, and the first and second crosslinked polymers can be a powder, pellet, fiber, or a combination comprising at least one of the foregoing. In one embodiment, the first crosslinked polymer and the second crosslinked polymer respectively can be introduced at a first feed rate and second feed rate. Further, the first and second feed rates can be variable. In a further embodiment, the feed rate of the first crosslinked polymer can be decreased as the feed rate of the second crosslinked polymer is increased. The crosslinked polymers can be combined in a mold, extruder, mixer, blender, and the like. In a specific embodiment, the crosslinked polymers are subjected to compression and heating in a compression molding process. In a further embodiment, the ratio of the amount of the first crosslinked polymer to the amount of the second crosslinked polymer can be varied during combining the first and second crosslinked polymers.

The articles thus made have the properties of the elastomer composition. In an embodiment, an article including the elastomer composition has a gradient in glass transition temperature that is continuous, discontinuous, or a combination thereof. In an additional embodiment, the article has a gradient in the crosslink density. In another embodiment, the article has a gradient in a relative amount of crosslinked polymers.

The article has a compressive strength greater than or equal to 10 kilopounds per square inch (ksi), specifically greater than or equal to 20 ksi, and more specifically greater than or equal to 32 ksi at 500° F.

Articles with a gradient in glass transition temperature herein can be formed in many different shapes, such as a ring, tube, pipe, rod, toroid, sphere, polygon, cone, cylinder, truncated shapes thereof, and the like. Such a shape can result from the molding process, extrusion, and the like. Additionally, the molded shape further can be subjected to various shaping processes including cutting, sawing, ablating, and other material removal methods.

The articles can be used in a wide variety of environments and are useful, in any application where an elastomer seal could be used. Since the articles herein have a broad elastomer temperature range (for example, 200° F. to 700° F.) even at high pressures, the article can be used as a sealing element such as a swab cup, chevron seal, O-ring, T-ring, gasket, packer, and the like in any device, fixture, tool, and the like that is amenable to elastomer sealing. In an embodiment, the article is used as a seal in a mud motor for downhole use. In another embodiment, the article is used as a seal in a load-lock chamber of a semiconductor testing vacuum chamber.

Thus, in an embodiment, a seal includes an elastomer composition herein. According to another embodiment, the article, e.g., the seal, can be disposed in an opening, heated to a temperature greater than a minimum value of the glass transition temperature of the seal, and pressure can be applied to an elastic portion of the seal for sealing the opening. In an additional embodiment, the seal can be cooled to a temperature such that the seal comprises a first portion that is in a glassy state and a second portion that is an elastic state.

Other polymers can be used to form a portion of the seals, i.e., one or more other polymers that are not the same as the polymers in the portion having a Tg gradient. The other polymers used in the seals can be a thermoset or thermoplastic, and specifically includes elastomers. Examples of other polymers include epoxies, ethylene propylene diene rubber (EPR), ethylene propylene diene monomer rubber (EPDM), melamines, polyacetals, polyacrylamides, polyacrylics such as polyacrylic acid, polyacrylonitriles, polyamides, including polyamideimide, polyarylene ethers, polyarylene sulfides, polyarylene sulfones, polybenzoxazoles, polybenzothiazole, polybutadienes and copolymers thereof, polycarbonates, polycarbonate esters, polyether ketones, polyether ether ketones, polyether ketone ketones, polyethersulfones, polyesters, polyimides such as polyetherimides, polyisoprenes and copolymers thereof, polyolefins such a polyethylene and copolymers thereof, polypropylene and copolymers thereof, and polytetrafluoroethylene, polyphosphazenes, poly(alkyl) (meth)acrylates, polystyrenes and copolymers thereof, rubber-modified polystyrenes such as acrylonitrile-butadiene-styrene (ABS), styrene-ethylene-butadiene (SEB), and methyl methacrylate-butadiene-styrene (MBS), polyoxadiazoles, polysilazanes, polysulfones, polysulfonamides, polyvinyl acetates, polyvinyl chlorides, polyvinyl esters, polyvinyl ethers, polyvinyl halides, polyvinyl nitriles, polyvinyl thioethers, polyureas, polyurethanes, and silicones. A combination comprising at least one of the foregoing polymers can be used. In an embodiment, the other polymer is a polybenzimidazole. It is to be understood that "not the same" means that the polymers differ in at least one property, e.g., degree or type of crosslinking. Thus, a polymer such as a crosslinked polyphenylene sulfide having a first degree of crosslinking or Tg is not the same as a polymer having the same backbone but a different degree of crosslinking or Tg.

Figure 2A:
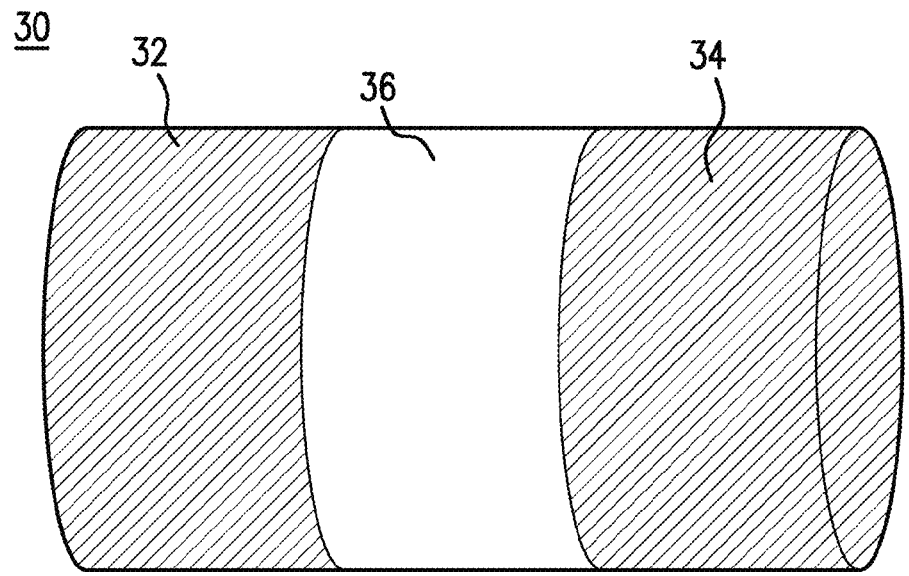
FIGS. 2A and 2B show perspective views of articles having discontinuous and continuous gradients in the glass transition temperature.

As indicated previously, the article can have a continuous or discontinuous gradient in the glass transition temperature. FIG. 2A shows a perspective view of an article 30 with a discontinuous glass transition temperature. End portions 32, 34 have a large crosslink density while central portion 36 has a relatively lower crosslink density. Thus, central portion 36 has a glass transition temperature that is lower than the glass transition temperature corresponding to end portions 32, 34. As a consequence, as the article 30 is heated from a temperature that is less than the minimum value of its glass transition temperature (that of central portion 36), the central portion 36 becomes elastic before the end portions 32, 34. If the temperature is maintained below the glass transition temperature of the end portions 32, 34, these will remain glassy, and a force applied longitudinally across article 30 will compress and distort central portion 36 while the end portions 32, 34 resist such deformation. As one will appreciate, such a design allows article 30 to behave as its own backup seal. That is, since end portions 32, 34 can be in a glassy state while central portion 36 is in an elastic state, the central portion 36 is "backed up" by end portions 32, 34, and no external backup seal or member is required for article 30. Backup seals and rings are used with common elastomers (e.g., fluoroelastomers) due to extrusion of the common elastomers under compressive forces, including both positive and negative pressures (with respect to one atmosphere of pressure) across the common elastomer.

It should be appreciated that the elastomer composition and article herein can be thermally cycled repeatedly between a low temperature (e.g., cryogenic temperatures) and high temperature (e.g., a temperature slightly less than the decomposition temperature of the crosslinked product), and the elastomer composition and article will maintain their chemical, physical, and mechanical properties without substantial deviation thereof. Further, the elastomer composition and article will maintain their chemical, physical, and mechanical properties without substantial deviation thereof even after soaking at the low or high temperature for an extended period, e.g., more than 3 months, specifically more than 6 months, more specifically more than 1 year, and yet more specifically more than 2 years.

Moreover, the article can be heated above the maximum value of the glass transition temperature to obtain full or substantially full elasticity of the article. Subsequently, the article can be cooled to a temperature between the maximum and minimum values of the glass transition temperature of the article such that the article includes a portion in a glassy state and a portion that is an elastic state, and the temperature can be soaked thereat to maintain the article in a partial glassy-partial elastic state. Upon further cooling below the minimum value of the glass transition temperature of the article, the article returns to the completely or substantially complete glassy state. Further, this thermal cycle can be repeated without damage to the article, or any portion of the thermal cycle can be repeated for modulating the article between completely glassy, completely elastic, or partially glassy-partially elastic states.

Figure 2B:
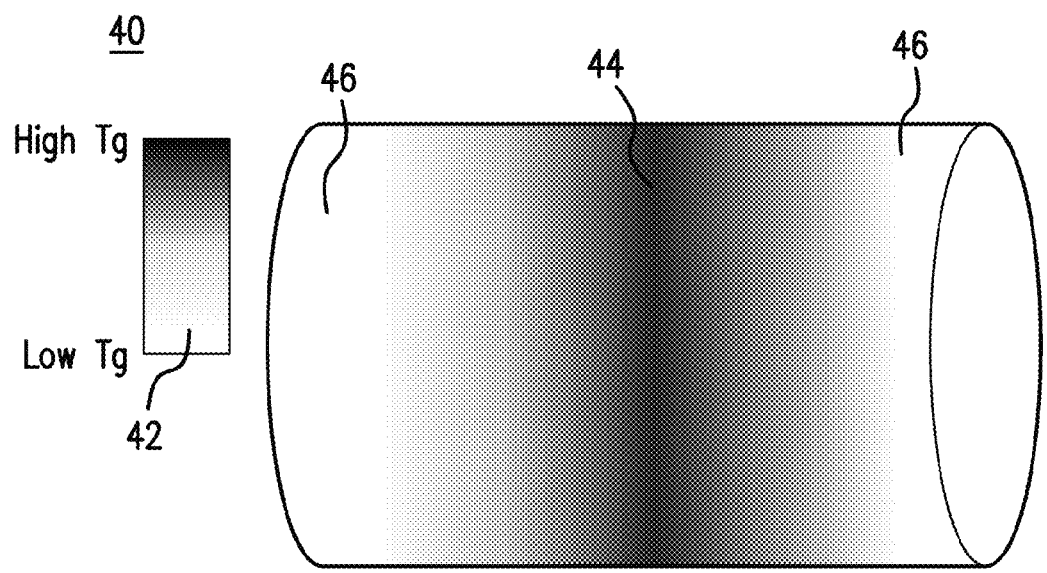

FIG. 2B shows a perspective view of an article 40 having a continuous gradient in glass transition temperature indicated in varying shades of a grayscale 42. The region of highest crosslink density 44 has the darkest value of the grayscale, and regions of lowest crosslink density 46 are indicated by the lightest value of the grayscale. Again, a region with lowest crosslink density corresponds to a minimum value in the glass transition temperature of the article 40. For article 40 with a continuous gradient in glass transition temperature, there will be a smooth transition from regions of elasticity to regions that are glassy above the minimum value of the glass transition temperature.

The article can be formed in various shapes and can have selectively positioned regions of low or high crosslink density in the crosslinked product. Above the minimum of the glass transition temperature of the article, application of a force can deform elastic portions of the article. Such deformation allows the article to form various cross-sectional shapes that are useful in a range of service applications, for example as a packer or slip in downhole environments.

Figure 3:
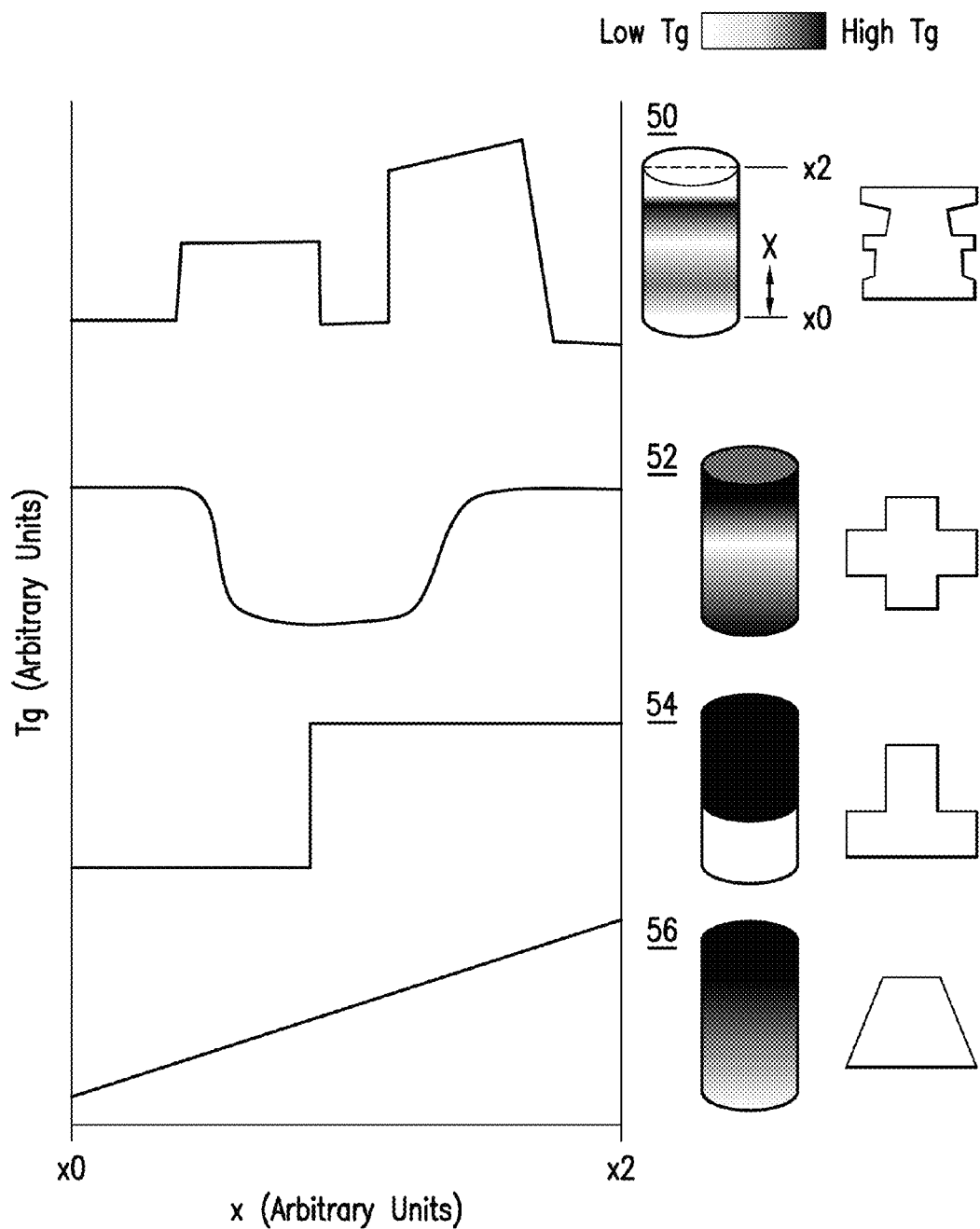
FIG. 3 shows a graph of glass transition temperature versus linear position along an article having a gradient in glass transition temperature.

FIG. 3 shows a graph of glass transition temperature (Tg) versus position (x) along one dimension for articles 50, 52, 54, 56 having an initial cylindrical shape. The bottom of each article 50, 52, 54, 56 is the initial position x0, and the top of each article 50, 52, 54, 56 is the final position x2 (used for the x-axis of the graph). Perspective views of the articles 50, 52, 54, 56 in the original cylindrical shape appear to the immediate right side of the graph and have a crosslink density indicated by the grayscale level shown in each article, where the darkest grayscale level (black) indicates greatest degree of crosslinking, while the lowest degree of crosslinking is indicated by lowest grayscale level (white). At a temperature from the minimum value of the glass transition temperature (Tg_min) to less than the maximum value of the glass transition temperature (Tg_max), a compressive force applied between the top (x1) and the bottom (x2) of the article (50, 52, 54, 56) produces the cross-sectional shape of the article (50, 52, 54, 56) shown on the far right side in FIG. 3. The portion of the each article (50, 52, 54, 56) corresponding to the maximum value of the glass transition temperature of the article does not deform at this temperature and maintains its original cross-sectional area and shape. The portion of each article (50, 52, 54, 56) corresponding to the minimum value of the glass transition temperature of the article deforms at this temperature to increase its cross-sectional area. In this manner, an article containing the elastomer composition having a crosslinked product of crosslinked polymers can be provided with a tailored shape that is activated by temperature or pressure. In another embodiment, instead of a compressive force, the force is a tensile force applied at the top and bottom of the article such that portions of the article that are at a temperature above their glass transition temperature are deformed by stretching and have a decreased cross-sectional area compared to their original, pre-applied force shape. In yet another embodiment, a force is applied to the article at an angle with respect to the longitudinal axis of the article. The angle can be from 0° to 180° with respect to the longitudinal axis. Under this force, the article can be deformed into various cross-sectional shapes at a temperature greater than a minimum of the glass transition temperature of the article.

Figure 4A:
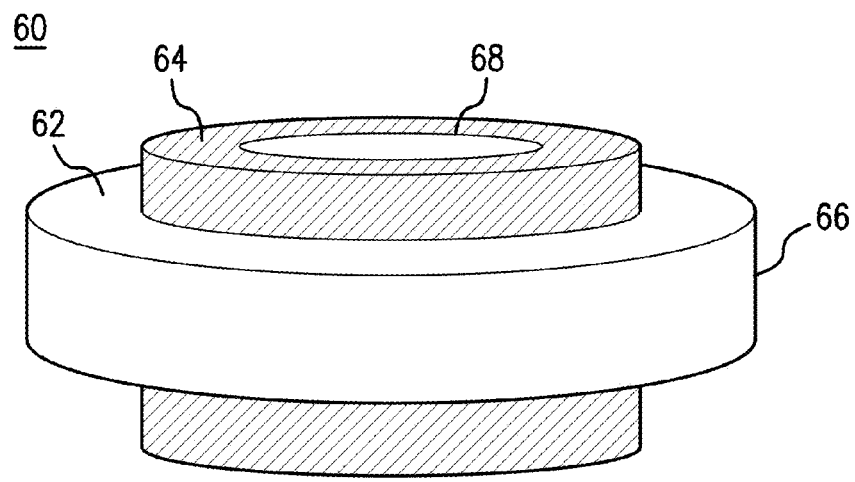
FIG. 4A shows a perspective view of an elastomeric seal including a composition that has a gradient in glass transition temperature.
Figure 4B:
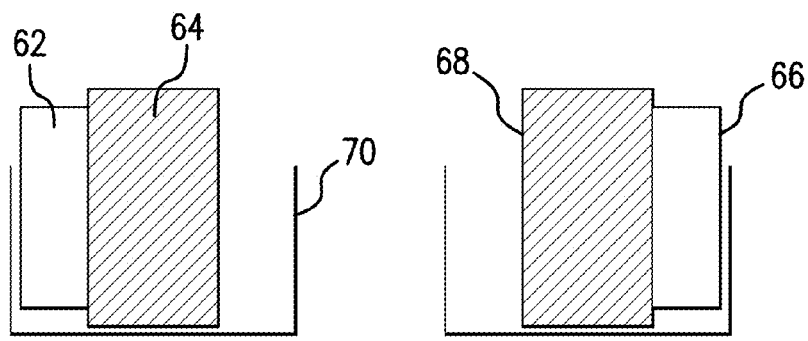
FIGS. 4B and 4C show cross-sections of an elastomeric seal before and after application of a compressive force, respectively.
Figure 4C:
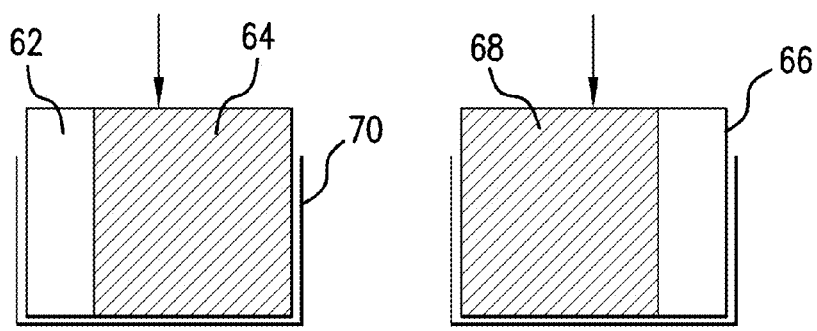

In another embodiment, the article can be an elastomer seal such as O-ring as shown in FIGS. 4A, 4B, and 4C. The O-ring 60 has an outer diameter 66, inner diameter 68, and a gradient in the glass transition temperature with a high Tg portion 62 and low Tg portion 64. The O-ring 60 is placed in a gland 70, and a force applied to O-ring 60 at a temperature above the minimum of the glass transition temperature (corresponding to the low Tg portion 64) of the O-ring 60 deforms the O-ring so that it fills the gland 70 and forms a seal between the outer diameter 66 and inner diameter 68. In an embodiment, the temperature is intermediate between the maximum and minimum of the glass transition temperature (respectively corresponding to the high Tg portion 62 and low Tg portion 64), and the high Tg portion 62 is in a glassy state and performs as a backup to the low Tg portion 64, which is in an elastic state. Although the O-ring 60 is indicated as having a discontinuous gradient in glass transition temperature, O-rings herein can have a continuous or discontinuous gradient in glass transition temperature.

Figure 5A:
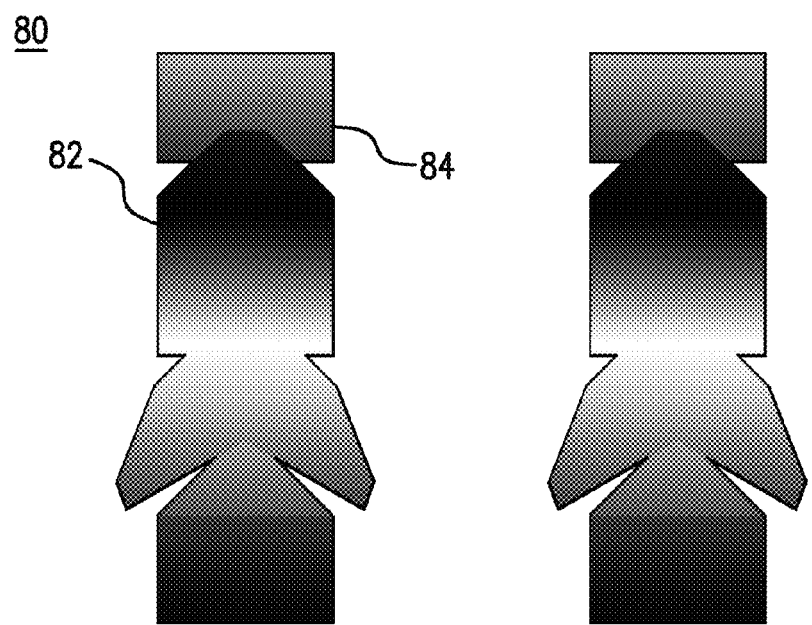
FIGS. 5A and 5B show cross-sections of an elastomeric seal as a single component and multiple component, respectively.
Figure 5B:
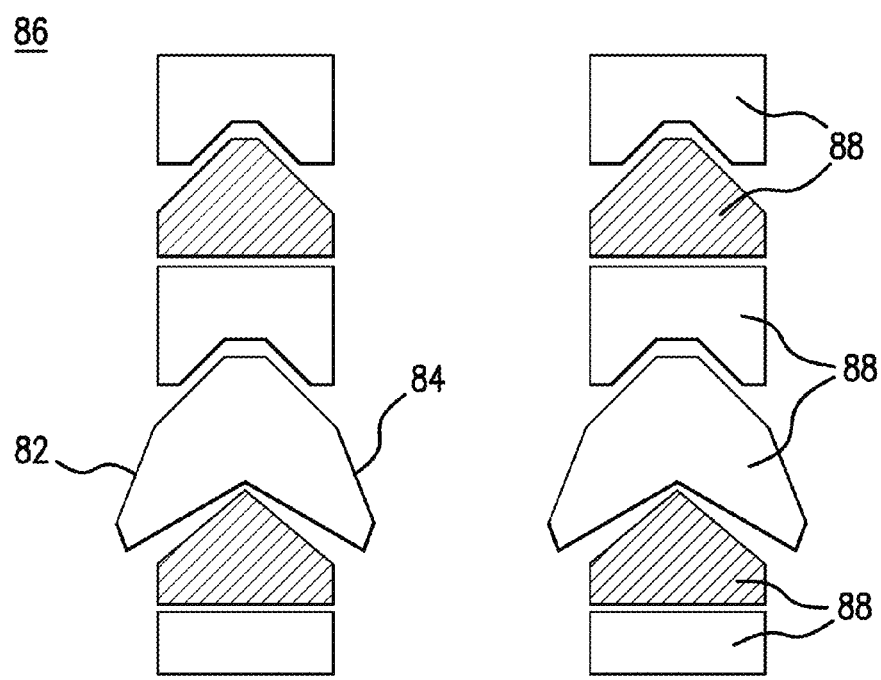

In an additional embodiment, the article can be an elastomer seal such as chevron seal as shown in FIGS. 5A and 5B. The chevron seal 80 has an outer diameter 82, inner diameter 84, and a gradient in the glass transition temperature provided by portions of the chevron seal 80 having a different degree of crosslinking as indicated by grayscale level in the FIG. 5A, where highest and lowest crosslink densities are indicated in black and white grayscale levels, respectively. It should be noted that a position, length (i.e., extent), and combination of different degrees of crosslinking in the chevron seal (as well as other articles herein) can be varied by selection of desired processing conditions (e.g., feed rates of crosslinked polymers and crosslinking temperature) in forming the elastomer composition. While FIG. 5A shows the chevron seal 80 as monolithic, FIG. 5B shows a cross-section of a chevron seal 86 that includes discreet pieces 88 that in a stacked configuration. Each piece 88 can have a gradient in transition glass temperature, or a piece 88 can be a pure crosslinked polymer not crosslinked to another crosslinked polymer. The shape of the chevron seal 80 can be formed as in the cross-section in FIG. 5A. In an embodiment, the shape of the chevron seal 80 can be produced by using a force (e.g., a hydraulic pressure) to deform portions of the chevron seal 80 that are in an elastic state due to the temperature of the chevron seal.

Figure 6A:
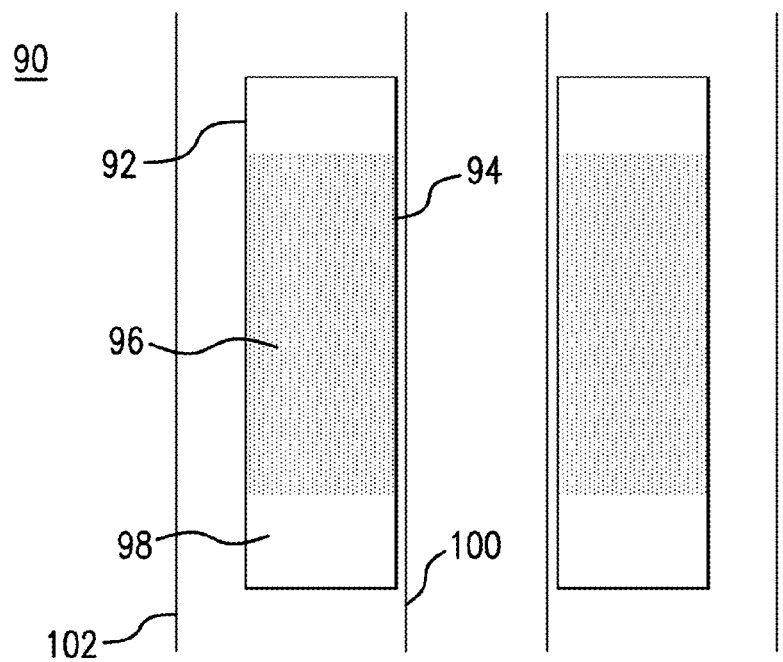
FIGS. 6A and 6B show cross-sections of a packer element before and after deployment, respectively.
Figure 6B:
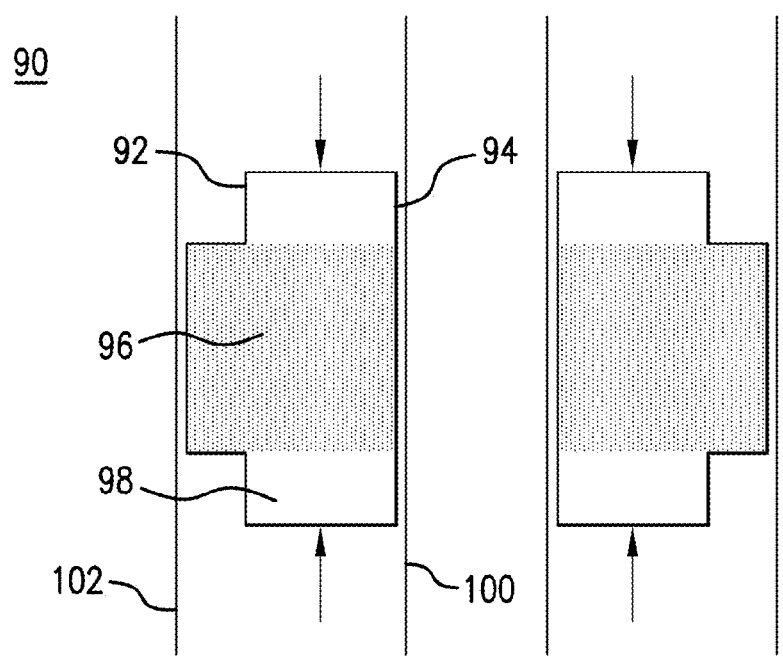

In a further embodiment, the article is a packer for use downhole in a borehole as shown in FIGS. 6A and 6B. The packer 90 has an outer diameter 92, inner diameter 94, and a gradient in the glass transition temperature provided by a low Tg portion 96 and a high Tg portion 98 of the packer 90. The inner diameter 94 of the packer 90 surrounds a tubular 100 disposed within an inner diameter of a wall or casing of the borehole 102. As the temperature of the packer 90 reaches a value intermediate between a minimum and maximum value of the glass transition temperature of the packer 90, a compressive force can be applied across the packer 90, and the outer diameter 92 corresponding to the low Tg portion 96 expands toward the borehole wall 102. The packer 92 is deployed when its outer diameter 92 contacts borehole wall 102, sealing an annular space between the tubular 100 and the borehole wall 102. The gradient in glass transition temperature can be continuous or discontinuous, which can affect the shape of the packer 92 upon expansion. Heating the packer 92 downhole can be by any method that heats the region surrounding the packer 92. Exemplary ways of heating include heated fluid injection, steam injection, exothermic chemical reactions, and the like.

Figure 7A:
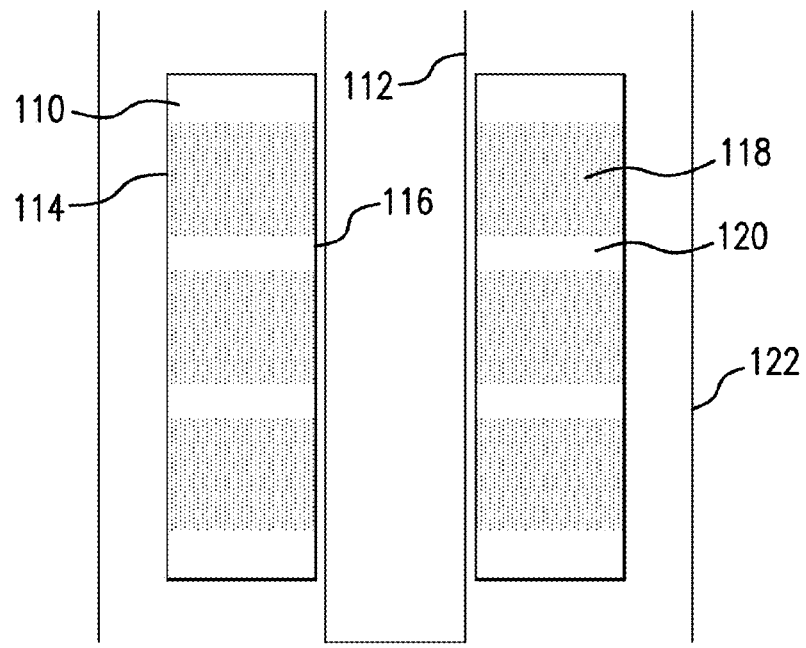
FIGS. 7A and 7B show cross-sections of a slip element before and after deployment, respectively.
Figure 7B:
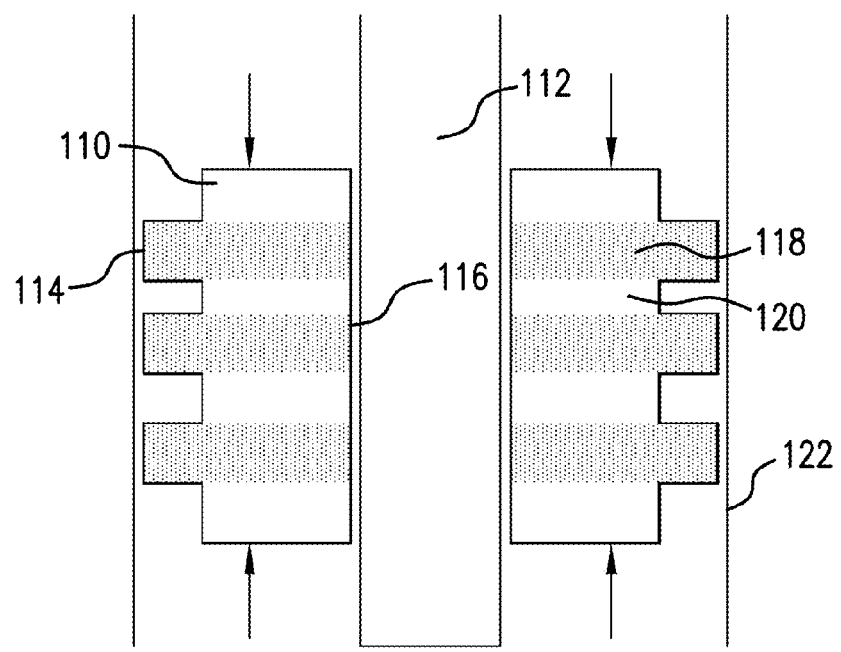

According to another embodiment, the article is a slip that can be used downhole, for example with a plug such as a bridge or frac plug. FIGS. 7A and 7B show cross-sections of a slip 110 disposed on a terminus of a frac plug 112. The slip 110 has an outer diameter 114, inner diameter 116, and a gradient in the glass transition temperature provided by a low Tg portion 118 and a high Tg portion 120 of the slip 110. The slip 110 and frac plug 112 are disposed within an inner diameter of an inner diameter of borehole wall 122. As the temperature of the slip 110 reaches a value intermediate between a minimum and maximum value of the glass transition temperature of the slip 110, a compressive force can be applied to the slip 110, and the outer diameter 114 corresponding to the low Tg portion 118 expands toward the borehole wall 122. The slip 110 is deployed as its outer diameter 114 contacts borehole wall 122, preventing the frac plug 112 from being displaced from its position within the borehole wall 122. The gradient in glass transition temperature can be continuous or discontinuous, which can affect the shape of the slip 110 upon expansion. Heating the slip 110 downhole can be by any method that heats the region surrounding the slip 110 similar to heating the packer 92.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. As used herein, the term "a" includes at least one of an element that "a" precedes, for example, "a device" includes "at least one device." "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A seal comprising:
a first portion including a crosslinked product of:
a first crosslinked polymer; and
a second crosslinked polymer different from the first crosslinked polymer;
the first crosslinked polymer being crosslinked with the second crosslinked polymer,
the first crosslinked polymer comprising a crosslinked polyphenylene sulfide, crosslinked polyphenylsulfone, crosslinked self-reinforced polyphenylene, crosslinked polyethersulfone, or a combination comprising at least one of the foregoing, and
the second crosslinked polymer comprising a crosslinked polyphenylene sulfide, crosslinked polyphenylsulfone, crosslinked self-reinforced polyphenylene, crosslinked polyethersulfone, or a combination comprising at least one of the foregoing; and
a second portion including a polymer which is different than a constituent polymer in the first portion,
wherein the seal has a gradient in glass transition temperature.

2. The seal of claim 1, wherein the polymer in the second portion is a thermoset, thermoplastic, or a combination comprising at least one of the foregoing.

3. The seal of claim 1, wherein the polymer in the second portion comprises epoxies, ethylene propylene diene rubber, ethylene propylene diene monomer rubber, melamines, polyacetals, polyacrylamides, polyacrylics, polyacrylonitriles, polyamides, polyarylene ethers, polyarylene sulfides, polyarylene sulfones, polybenzoxazoles, polybenzothiazole, polybutadienes and copolymers thereof, polycarbonates, polycarbonate esters, polyether ketones, polyether ether ketones, polyether ketone ketones, polyethersulfones, polyesters, polyimides, polyisoprenes and copolymers thereof, polyolefins, polyphosphazenes, poly(alkyl) (meth)acrylates, polystyrenes and copolymers thereof, rubber-modified polystyrenes polyoxadiazoles, polysilazanes, polysulfones, polysulfonamides, polyvinyl acetates, polyvinyl chlorides, polyvinyl esters, polyvinyl ethers, polyvinyl halides, polyvinyl nitriles, polyvinyl thioethers, polyureas, polyurethanes, silicones, or a combination comprising at least one of the foregoing.

4. The seal of claim 1, wherein the polymer in the second portion comprises polybenzimidazole.

5. The seal of claim 1, wherein the first portion of the seal comprises the crosslinked product of crosslinked polyphenylene sulfide, crosslinked polyphenylsulfone, and crosslinked self-reinforced polyphenylene.

6. The seal of claim 1, the first portion of the seal further comprising an additive, which includes silica, glass fiber, carbon fiber, or carbon black, or a combination comprising at least one of the foregoing.

7. The seal of claim 1, wherein the seal has a gradient in the concentration of the first crosslinked polymer, second crosslinked polymer, or a combination of at least one of the foregoing.

8. The seal of claim 1, wherein the seal has a gradient in the ratio of the amount of the first crosslinked polymer to the amount of the second crosslinked polymer.

9. The seal of claim 8, wherein the ratio of the amount of the first crosslinked polymer to the amount of the second crosslinked polymer is 1:1000 to 1000:1, based on the weight of the first and second crosslinked polymers.

10. A seal comprising a first portion including a crosslinked product of a first crosslinked polymer and a second crosslinked polymer; and a second portion including a polymer which is different than a constituent polymer in the first portion, wherein the seal has a gradient glass transition temperature and the glass transition occurs over a temperature domain of 300 degrees on the Fahrenheit temperature scale.

11. The seal of claim 10, wherein the seal has a glass transition which occurs over a temperature domain which is greater than 100 degrees on the Fahrenheit temperature scale.

12. The seal of claim 10, wherein the gradient in glass transition corresponds to a temperature domain of 200° F. to 500° F.

13. The seal of claim 1, wherein the gradient in glass transition temperature is continuous.

14. The seal of claim 1, wherein the gradient in glass transition temperature is discontinuous.

15. The seal of claim 1, wherein the first crosslinked polymer has a first crosslink density, and the second crosslinked polymer has a second crosslink density, wherein the first crosslink density is different than the second crosslink density.

16. A method for sealing, comprising:
disposing the seal of claim 1 in an opening;
heating the seal to a temperature greater than a minimum value of the glass transition temperature of the gradient; and
applying pressure to an elastic portion of the seal for sealing the opening.

17. The method of claim 16, further comprising adjusting the temperature of the seal to a value which is less than a first glass transition temperature corresponding to a first portion of the seal which is in a glassy state, and the value is greater than a second glass transition temperature corresponding to a second portion of the seal which is an elastic state, wherein the first glass transition temperature is greater than the second glass transition temperature in the gradient.

* * * * *